April 11, 1961  F. L. ATHA  2,978,709
FACE SHIELD
Filed March 11, 1957
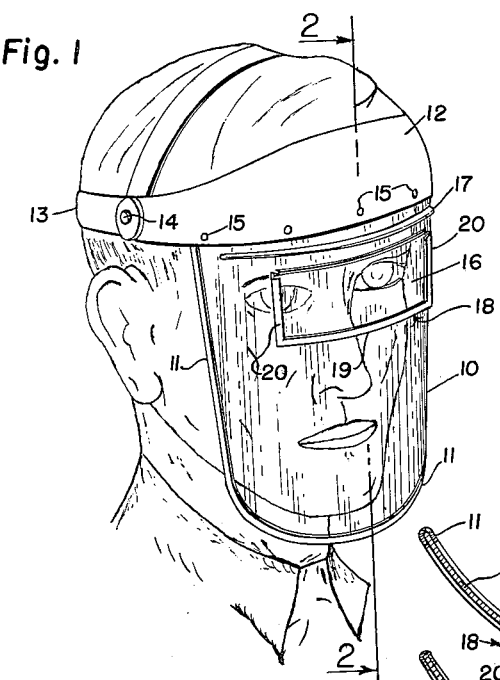
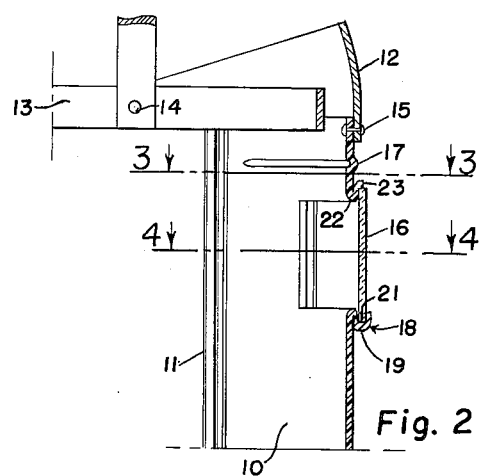
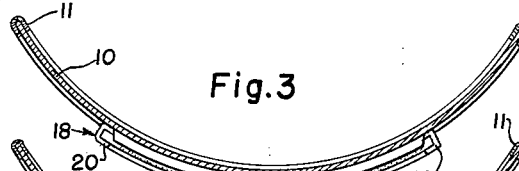
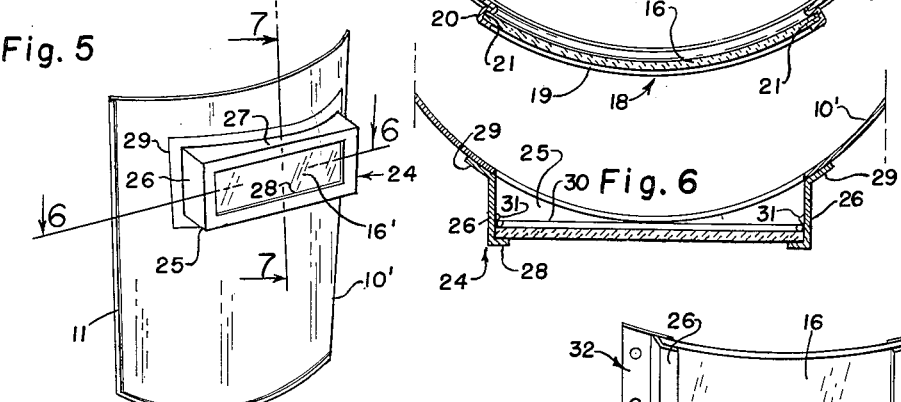
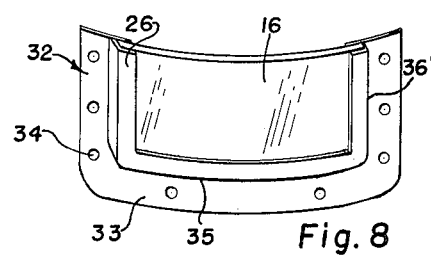
INVENTOR.
Floyd L. Atha
BY Whitehead, Vogl & Lowe
Per
ATTORNEYS 2,978,709

FACE SHIELD

Floyd L. Atha, 930 Acoma St., Denver, Colo.

Filed Mar. 11, 1957, Ser. No. 645,153

2 Claims. (Cl. 2—9)

This invention relates to protective face shields, and more particularly to transparent protective face shields of the type which are commonly used in industrial work where it is desirable and necessary to protect the face and eyes of a workman from flying particles such, for example, as flying chips and particles which are present during chipping and grinding operations.

Face shields for such purposes are preferably transparent to give the workman complete freedom of vision at all times without having to remove his shield, and as such the shields are necessarily made of thin sheets of plastic material such as cellulose acetate or the like. The toughness and flexibilty of such plastic sheets give remarkable protection for their extreme light weight. The use of material such as glass for a transparent face shield would be completely unsatisfactory because it is rigid and brittle. It would have to be unreasonably heavy and would break or shatter if dropped or struck a sharp blow.

However, transparent plastic face shields have been found to be undesirable for many purposes because after they are used for a short period of time they mar and cloud up and impair and limit the vision of the worker using them. The comparatively soft surface of a plastic shield is especially susceptible to marring where a flying chip or particle strikes it. It is easily marred by scratching when it is laid down on the ground or other rough surface and it is even marred and clouded up by an accumulation of dust. Moreover, these shields are difficult to clean. The will cloud up and will even be marred and scratched by the scouring action of a cloth when they are necessarily washed to remove dust and dirt accumulations.

Because of this undesirable feature of clouding up it is necessary to replace plastic face shields at frequent intervals and the headgear to which the face shields are attached is generally designed with releasable attachment means to permit easy connection and disconnection of the shields to and from the headgear. Such replacement is an undesirable and unnecessary expenditure because a shield is often clouded up only at the areas in line with direct vision of the wearer although it is otherwise comparatively clear. It is essential that clarity of the shield be maintained in the area of direct vision of the wearer but in many activities where the shields are used it is comparatively unimportant if other areas of the shield be clouded. If clear direct vision could be maintained it would be possible to use such a shield for a comparatively long period of time without replacement.

With such in view, the present invention was conceived and developed and comprises in essence, a novel and improved face shield which is formed of plastic materials and incorporates therein a glass section at the area in line with the direct vision of the wearer.

Accordingly, the objects of the invention are to provide a novel and improved transparent plastic face shield having a glass section in the area in line with direct vision of the wearer which: (a) integrates in an easily marred plastic face shield which will cloud up when washed, a clear unscratchable vision area which may be washed without marring; (b) combines the desirable features of a lightweight, tough unbreakable plastic shield with a vision-clear glass section in the area of direct vision; (c) substantially increases the useful life of a conventional transparent plastic face shield and eliminates the need for providing replacements for headgear carrying such shields; (d) is a worthy improvement over conventional plastic face shields for only a slight additional increase of cost; and (e) is an economical, simply constructed, neat appearing, easily cleaned, strong and durable unit.

With the foregoing and other objects in view, all of which more fully hereinafter appear, my invention comprises certain novel and improved constructions, combinations and arrangements of parts and elements as hereinafter described and as defined in the appended claims, and illustrated in preferred embodiments in the accompanying drawing, in which:

Figure 1 is a front perspective view of a man wearing headgear holding a transparent plastic face shield constructed in accordance with the principles of my invention.

Figure 2 is a sectional elevational detail as viewed from the indicated line 2—2 at Fig. 1 but on an enlarged scale.

Figure 3 is a sectional plan as viewed from the indicated line 3—3 at Fig. 2.

Figure 4 is a sectional detail as viewed from the indicated line 4—4 at Fig. 2.

Figure 5 is a perspective view of a transparent face shield per se, similar to Fig. 1 but showing an alternate construction of the improvement therein.

Figure 6 is a sectional detail as viewed from the indicated line 6—6 at Fig. 5 but on an enlarged scale.

Figure 7 is a sectional detail as viewed from the indicated line 7—7 at Fig. 5 but on an enlarged scale.

Figure 8 is a perspective view of an encased glass section adapted to be mounted in the vision area portion of a face shield, such being constructed in accordance with the invention but illustrating another modified form thereof.

Referring more particularly to the drawing, the transparent face shield 10 is patterned in a conventional mode, being generally rectangular in form and arched about a vertical axis to cover a substantial portion of the wearer's face. A reinforcing rim or edge 11 may be affixed to the side and bottom margins of this shield to provide suitable trimming. The upper untrimmed margin is connected to a swingable forehead loop 12 of a carrier headband 13, the loop being pivotally connected to the headband 13 as by temple pivots 14 to permit the shield to be lifted above the face of the wearer. The connection of the face shield to the forehead loop may be by rivets 15 or by any other suitable permanent or disconnectible means.

The normal direct vision areas of the face shield may be defined as a rectangle centered about the wearer's eyes and is approximately two inches high and four and one-half inches wide although such dimensions may be varied within reasonable limits. My invention contemplates that the face shield will be made of tough plastic material which may nevertheless be marred and clouded by use. However, the improved shield will have a vision area of hard, clear, washable glass. This vision glass 16 is substantially rectangular in shape and is arched to conform with the arch of the plastic face shield about the face of the wearer. To maintain such a selected arch in the plastic face shield which is of comparatively flexible material, one or more corrugations such as at 17 may be formed at the upper portion of the shield 10 above the glass or at other suitable locations.

The arched vision glass 16 is suitably encased in a properly located like-size opening in the face shield. In the preferred construction shown at Figs. 1 to 4 this arched vision glass 16 is encased in a lightweight frame 18 which is molded to shape directly from the plastic material forming the shield. The formation of this frame may be accomplished by simple molding operations since the plastic material which is ordinarily used to form a face shield is thermo plastic in nature and susceptible of such molding operations.

The lower edge 19 and upright side edges 20 of this frame 18 are formed with a closed 180 degree outward overfold of the plastic material with the folded material being tightly against the sheet, and thence with an opened 180 degree reversing inward overfold to provide a socket or channel 21 wherein the vision glass may be securely set. The upper edge 22 is formed by a similar tight 180 degree upward overfold of the plastic material against itself and thence a 90 degree bend to form a short outstanding lip 23 which abuts against the edge of the glass 16.

The plastic sheet forming the shield 10 is sufficiently rigid to hold the vision glass in place in normal use and the lip 23 will prevent the glass from accidently coming out of the socket or channel 21 formed by the lower and side edges of the frame 18. However, the plastic sheet will be sufficiently supple to permit it to be flexed to move the lip 23 from its abutment against the edge of the vision glass 16 to permit the glass to be removed from the face shield whenever it is desired to do so, for example to replace or to remove the vision glass 16 for washing.

The construction illustrated at Figs. 5, 6 and 7 incorporates a modified face shield 10' which uses a flat vision glass 16'. This construction requires a modified frame or case 24 which must be affixed to the arched surface of the face shield 10' but outstand therefrom to provide a flat outer surface or face to hold the flat vision glass 16'. This case is therefore formed with a comparatively wide bottom 25, sides 26 and top 27 with the edges of the bottom 25 and top 27 which contact the face shield 10' being suitablly arched.

The size of this case is such as to receive the flat vision glass 16' within it and an inward lip 28 extends about the outer face of the case to form a retaining edge to hold the vision glass 16' in place. An opposite outward flange 29 extends about the bottom, sides and top at the arched face or edges contacting the face shield 10' and this flange is suitably welded or otherwise affixed to the face shield to attach the case 24 in position thereon.

The flat vision glass is inserted into the case against the inner lip 28 and it is held therein by a U-shaped spring clip 30 which lies against the inner walls of the case and against the glass, suitable upstanding knobs 31 being molded in the case side walls 26 to hold this spring clip in place.

The construction illustrated at Fig. 8 is an arched frame 32 for holding an arched vision glass 16 and is a further modification of the Fig. 1 to 4 construction. The frame 32 may be made of rigid plastic or metal. It is formed upon a U-shaped arched flange 33 which includes suitable orifices 34 for riveting it or otherwise securing it to the face shield 10. The channels outstand from this flange 33 to form a bottom channel 35 and side channels 36 to hold the vision glass 16. The glass may be held in these channels in any suitable manner such as by cementing it in position.

While I have now described my invention in considerable detail, it is obvious that other skilled in the art can devise and build alternate and equivalent constructions which are within the scope and spirit of my invention. Hence, I desire that my protection be limited not by the constructions and details herein described but only by the proper scope of the appended claims.

I claim:

1. A transparent face shield formed as an arched sheet adapted to cover the face of a wearer and including a direct vision opening within the body of the sheet and a rigid conformingly arched glass plate within the direct vision opening, said sheet being formed of comparatively thin, tough, flexible, transparent material and including groove-forming folds about the direct vision opening adapted to receive the edges of the glass plate to contain the plate within said direct vision opening.

2. A transparent face shield formed as an arched sheet adapted to cover the face of a wearer and including a direct vision opening within the body of the sheet and a rigid conformingly arched glass plate within the direct vision opening, said sheet being formed of comparatively thin, tough, flexible, transparent material, said glass plate being substantially rigid and said sheet including groove-forming folds about the direct vision opening adapted to receive the edges of the glass plate to contain the plate within said direct vision opening and including transverse corrugations above the vision area section in the shield adapted to rigidify the sheet to conform with the arch of said glass plate.

References Cited in the file of this patent

UNITED STATES PATENTS

| | | |
|---|---|---|
| 2,631,287 | Malcom | Mar. 17, 1953 |
| 2,648,844 | Brown | Aug. 18, 1953 |
| 2,786,204 | Simpson | Mar. 26, 1957 |
| 2,799,862 | Rowe | July 23, 1957 |